United States Patent
Mansur (10) Patent No.: US 7,167,523 B2
(45) Date of Patent: Jan. 23, 2007

(54) SPACIAL DERIVATIVE BUS ENCODER AND DECODER

(75) Inventor: Daniel C. Mansur, Chippewa Falls, WI (US)

(73) Assignee: Silicon Graphics, Inc., Sunnyvale, CA (US)

(*) Notice: Subject to any disclaimer, the term of this patent is extended or adjusted under 35 U.S.C. 154(b) by 516 days.

(21) Appl. No.: 10/171,095

(22) Filed: Jun. 13, 2002

(65) Prior Publication Data

US 2003/0072378 A1    Apr. 17, 2003

Related U.S. Application Data

(63) Continuation of application No. 08/971,185, filed on Nov. 17, 1997, now Pat. No. 6,480,548.

(51) Int. Cl.
*H04B 14/04* (2006.01)
*H03K 5/22* (2006.01)

(52) U.S. Cl. .................. 375/242; 375/297; 327/72; 327/74

(58) Field of Classification Search ........... 375/242, 375/340, 295, 297, 257; 327/72, 82, 71, 327/89, 69, 50, 63, 90, 74; 330/124 R, 69
See application file for complete search history.

(56) References Cited

U.S. PATENT DOCUMENTS

| 4,375,051 A | 2/1983 | Theall ............... 333/17 |
| 4,477,713 A | 10/1984 | Cook et al. ........ 219/124.34 |
| 4,514,749 A | 4/1985 | Shoji ............... 357/68 |
| 4,525,684 A | 6/1985 | Majefski |
| 4,587,445 A * | 5/1986 | Kanuma ............ 326/28 |
| 4,799,214 A | 1/1989 | Kaku |
| 4,823,184 A | 4/1989 | Belmares-Sarabia et al. . 358/27 |
| 4,918,685 A | 4/1990 | Tol et al. |
| 4,926,066 A | 5/1990 | Maini et al. .......... 307/303.1 |
| 4,935,741 A | 6/1990 | Reich ............... 341/150 |
| 4,982,428 A | 1/1991 | Agazzi et al. |
| 5,144,174 A | 9/1992 | Murakami ........... 307/608 |
| 5,274,836 A * | 12/1993 | Lux ................ 455/1 |
| 5,295,132 A * | 3/1994 | Hashimoto et al. ...... 370/242 |
| 5,315,175 A | 5/1994 | Langner ............ 307/443 |
| 5,410,263 A | 4/1995 | Waizman |
| 5,416,606 A | 5/1995 | Katayama et al. ..... 358/467 |
| 5,481,567 A | 1/1996 | Betts et al. .......... 375/261 |

(Continued)

OTHER PUBLICATIONS

* "Low Power Quad Differential Line Driver with Cut-Off", *National Semiconductor, F100K ECL 300 Series Databook and Design Guide*, pp. 2-54-2-60, (1992).

(Continued)

*Primary Examiner*—Kevin Burd
(74) *Attorney, Agent, or Firm*—Schwegman, Lundberg, Woessner & Kluth, P.A.

(57) ABSTRACT

A method and apparatus for providing efficient and accurate electronic data transmission of information on a data bus in the presence of noise. Data signals are received on a plurality of input lines by a spacial derivative encoder. The spacial derivative encoder encodes the signals and transmits them to a receiver having a spacial derivative decoder. The spacial derivative decoder then decodes the signals. Minimal overhead is required as for n input lines only n+1 lines are needed to transmit each of the encoded signals.

13 Claims, 5 Drawing Sheets

U.S. PATENT DOCUMENTS

| | | | |
|---|---|---|---|
| 5,487,095 A | 1/1996 | Jordan et al. | 375/371 |
| 5,537,068 A | 7/1996 | Konno | 327/115 |
| 5,544,203 A | 8/1996 | Casasanta et al. | 375/376 |
| 5,579,336 A | 11/1996 | Fitzgerald et al. | 375/219 |
| 5,583,454 A | 12/1996 | Hawkins et al. | 326/81 |
| 5,598,442 A | 1/1997 | Gregg et al. | 375/354 |
| 5,604,450 A | 2/1997 | Borkar et al. | 326/82 |
| 5,621,774 A | 4/1997 | Ishibashi et al. | 375/371 |
| 5,657,346 A | 8/1997 | Lordi et al. | 375/224 |
| 5,778,214 A | 7/1998 | Taya et al. | 395/551 |
| 5,790,838 A | 8/1998 | Irish et al. | 395/555 |
| 5,793,259 A | 8/1998 | Chengson | 331/78 |
| 5,802,103 A | 9/1998 | Jeong | 375/220 |
| 5,811,997 A | 9/1998 | Chengson et al. | 327/112 |
| 5,832,047 A | 11/1998 | Ferraiolo et al. | 375/356 |
| 5,844,954 A | 12/1998 | Casasanta et al. | 375/373 |
| 5,847,592 A | 12/1998 | Gleim et al. | 327/403 |
| 5,870,340 A | 2/1999 | Ohsawa | 365/189.02 |
| 5,872,471 A | 2/1999 | Ishibashi et al. | 327/98 |
| 5,898,729 A | 4/1999 | Boezen et al. | 375/259 |
| 5,920,213 A | 7/1999 | Graf, III | 327/144 |
| 5,922,076 A | 7/1999 | Garde | 713/600 |
| 5,946,712 A | 8/1999 | Lu et al. | |
| 5,948,083 A | 9/1999 | Gervasi | 710/62 |
| 6,005,895 A | 12/1999 | Perino et al. | 375/288 |
| 6,075,832 A | 6/2000 | Geannopoulos et al. | |
| 6,226,330 B1 | 5/2001 | Mansur | |
| 6,417,713 B1 | 7/2002 | DeRyckere et al. | 327/271 |
| 6,421,377 B1 | 7/2002 | Langberg et al. | 375/222 |
| 6,486,723 B1 | 11/2002 | DeRyckere et al. | 327/271 |
| 6,522,173 B1 | 2/2003 | Otsuka | 326/101 |
| 6,557,110 B2 | 4/2003 | Sakamoto et al. | 713/503 |
| 6,574,270 B1 | 6/2003 | Madkour et al. | 375/148 |
| 7,031,420 B1 | 4/2006 | Jenkins et al. | |
| 2001/0033630 A1 | 10/2001 | Hassoun et al. | 375/376 |

OTHER PUBLICATIONS

* Djordjevic, A. R., et al., "Time Domain Response of Multiconductor Transmission Lines", *Proceedings of the IEEE*, 75(6), (Jun. 1987),743-64.

* Im, G., et al., "Bandwidth-Efficient Digital Transmission over Unshielded Twisted-Pair Wiring", *IEEE Journal on Selected Areas in Communications*, 13(9), (Dec. 1995), 1643-1655.

Lee, Kyeongho, et al., "A CMOS Serial Link for 1 Gbaud Fully Duplexed Data Communication", *Symposium on VLSI Circuits, US, NY IEEE*, XP000501054, (Jun. 9, 1994), 125-126.

* Mooney, Randy, et al., "A 900 Mb/s Bidirectional Signaling Scheme", *IEEE Journal of Solid-State Circuits*, 30(12), (Dec. 1995), 1538-1543.

* cited by examiner

SPACIAL DERIVATIVE BUS ENCODER AND DECODER

RELATED APPLICATIONS

This application is a continuation application of Ser. No. 08/971,185, filed on Nov. 17, 1997 now U.S. Pat. No. 6,480,548, entitled SPACIAL DERIVATIVE BUS ENCODER AND DECODER.

BACKGROUND OF THE INVENTION

1. Field of the Invention

The present invention relates in general to methods and apparatus for electronic data transmission, and in particular to a system and method for efficiently and accurately transmitting information on a data bus in the presence of noise.

2. Background Information

A data bus commonly consists of lines for transferring data words between devices within a computer. A data word is made up of data bits transmitted as varying voltages on the data bus lines. Noise, interference, or other events such as ground voltage shifts between transmitter and receiver alter the signal such that what is sent may not be what is received. The possibility of signal alteration, whether or not it actually occurs, creates a need for ways to improve signal integrity. Both hardware and software solutions have been considered in the development of accurate data transmission methods.

One method of improving signal integrity is to run a separate ground line between the transmitter and receiver. The ground line voltage is used as a reference voltage. The difference between the data signal received at the receiver and the ground line voltage at the receiver is used to determine the signal polarity. One problem with this method is that it is not precise—the margin of error inherent in measuring voltage levels at the receiver may either mask or exaggerate voltage level variations due to noise. In addition, since there is no signal being driven down the ground line, the ground line voltage may be affected differently by the interfering source, again potentially masking or exaggerating transmission errors. Many applications have a need, however, for highly accurate message transfer.

Another message verification method is to run a differential line for each data line. According to this method there are two lines for every channel between the transmitter and the receiver. The first line carries the signal and the second line carries the complement of that signal (for example, where the first line value is '1', the second line value is '0'). The message being transferred is represented by the difference between the two signals. Any ground voltage shifts occurring during transmission equally affect both lines, so there is no net effect on the message because the difference between the two lines remains constant. One of the primary benefits of this method is that it requires no local reference value. The weakness is that it doubles the number of required transmission lines. With the continual push to manufacture devices with more elements and smaller overall size, there is a need to achieve a higher level of signal accuracy with minimal hardware overhead requirements.

SUMMARY OF THE INVENTION

A method is provided for electronically transmitting information on a data bus efficiently and effectively. The method of the present invention can be used in combination with a variety of operational modes, including but not limited to full duplex communications. By reducing noise generation at the transmitter and rejecting common mode noise at the receiver, the system of the present invention increases the data bandwidth on data buses.

The embodiments of the present invention are improvements over conventional systems and methods in part because fewer transmission lines are required and as a result noise generated at the transmitter circuit is reduced. Conventional differential transmission systems use 2*n lines for n bits, where the system of the invention requires only n+1 lines. In addition, power consumed by the transmitter circuit is decreased because fewer signals have to be transmitted. The reduced number of required lines allows devices employing the system and methods of the invention to maintain high quality data transmission while reducing the costs associated with manufacturing and maintaining more transmission lines. Another advantage of the present invention is that common mode noise is removed at the receiver. In one embodiment the system of the invention also compensates for crosstalk between the signals.

According to one embodiment of the invention, a method of encoding n signals is provided, using a reference voltage signal, wherein the differences between adjacent signals are determined and transmitted as n+1 encoded signals. A method of decoding m encoded signals is also provided, wherein the encoded signals are processed through an array of resistors, giving the original n signals.

Another embodiment describes a spacial derivative encoder, comprising one or more differential amplifiers, including a first and a second differential amplifier, one or more input data lines connected to the one or more differential amplifiers, a fixed reference voltage line, connected to the first and the second differential amplifier, and one or more output transmission lines connected to the one or more differential amplifiers, the number of output transmission lines equal to n+1, where n is the number of input data lines. A spacial derivative decoder is also provided, comprising one or more input transmission lines, one or more differential amplifiers, the number of differential amplifiers equal to m−1, where m is the number of encoded input transmission lines, a resistor network electrically located between the one or more input transmission lines and the one or more differential amplifiers, and one or more output data lines connected to the one ore more differential amplifiers, the number of output data lines equal to the number of differential amplifiers. In an additional embodiment the resistor network further comprises an array of resistors for averaging signals received on the one or more input transmission lines. Yet another embodiment provides a communications system, comprising a spacial derivative encoder and a spacial derivative decoder.

In another embodiment, signals are processed through a time-domain encoding scheme prior to differential encoding. This allows the system to account for the actual variation of a signal voltage, thereby compensating for signal dispersion and reducing base line wander due to frequency-dependent attenuation on lines. Time-domain encoding also reduces inter-symbol interference resulting from reflections or dispersion on the signal lines.

DETAILED DESCRIPTION OF THE PREFERRED EMBODIMENTS

In the following Detailed Description of the Preferred Embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
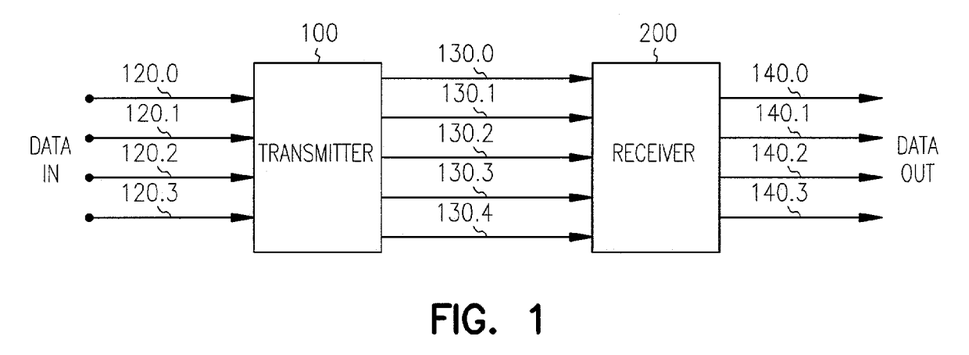
FIG. 1 is a block diagram of a transmitter transferring encoded data to a receiver over a signal line.

FIG. 1 is a block diagram of the basic process involved in transmitting data across a network. Input data is transferred to transmitter 100 from where it is then transmitted over one or more signal lines 130.0–130.4 to receiver 200. Receiver 200 then transfers the data out. An accurate data transmission system outputs data from receiver 200 which matches that input into transmitter 100. In one embodiment of the present invention data verification is accomplished through encoding the input data at transmitter 100 and then transmitting the encoded data to receiver 200 where it is decoded and verified before being transferred out.

Figure 2:
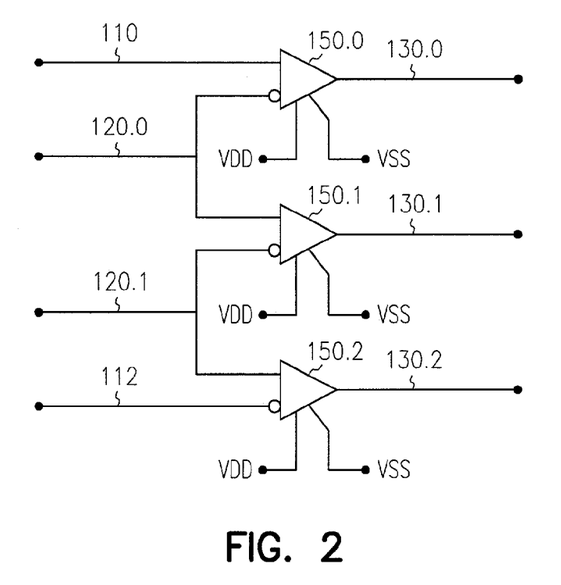
FIG. 2 is a schematic drawing of a spacial derivative encoder/driver 100 comprising two input data lines according to one embodiment of the present invention.

FIG. 2 is a schematic drawing of a transmitter 100 comprising a spacial derivative encoder/driver according to one embodiment of the present invention. According to the embodiment shown, inputs to the encoder 100 include two fixed reference voltage lines 110, 112, and two input data lines 120.0–120.1. Data inputs are processed through differential amplifiers 150.0–150.2. A differential amplifier is a dual-input amplifier that amplifies the difference between its two signal inputs. A differential amplifier eliminates or greatly minimizes many common sources of error. For example, drift errors tend to cancel out in a differential architecture. In addition, a differential amplifier is able to reject common-mode signals (that is, unwanted signals present at both of the amplifier inputs or other common points).

Figure 3:
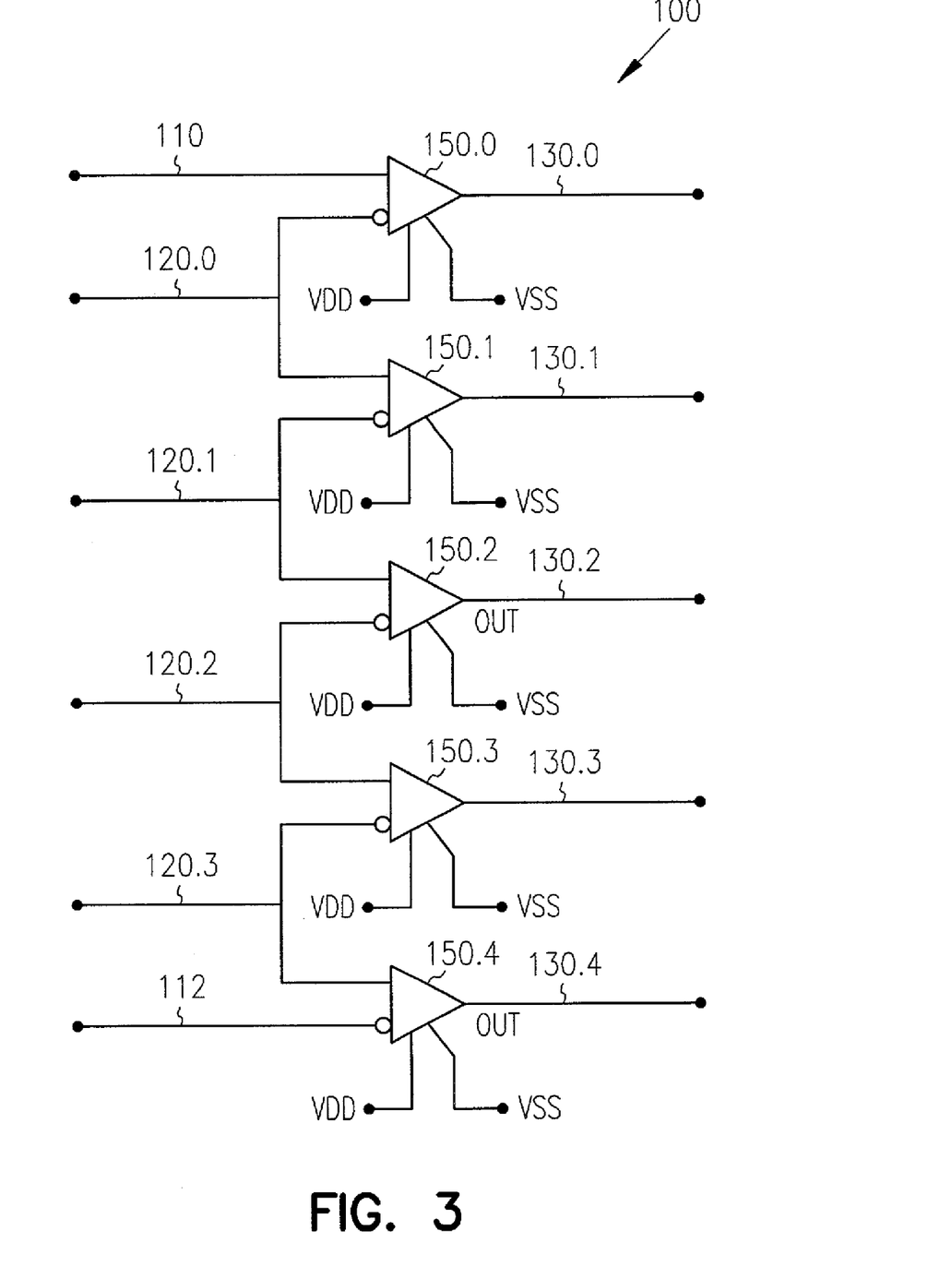
FIG. 3 is a schematic drawing of a spacial derivative encoder/driver 100 comprising four input data lines according to another embodiment of the present invention.

Amplifiers 150.0–150.2 have a differential output on transmission lines 130.0–130.2. To accomplish spacial encoding, the system drives each output transmission line 130 with the difference between the signals on adjacent input data lines 120. In the case of the first and last input data lines 120.0, 120.1, the respective amplifiers compare the input data with input from fixed reference voltage lines 110, 112 and adjacent input data lines 120.1, 120.0, respectively. Those skilled in the art will recognize that neither the spirit nor scope of the invention is exceeded by configurations incorporating a different number of input data lines. The number of input data lines that can be encoded in this way can be any number greater than zero. FIG. 3 is another example, and illustrates the spacial derivative encoder of the present invention encoding four input data lines 120.0–120.3. The first differential amplifier 150.0 compares reference voltage line 110 and input data line 120.0, giving output on output transmission line 130.0. The second differential amplifier 150.1 compares input data line 120.0 and input data line 120.1, giving output on output transmission line 130.1. The third differential amplifier 150.2 compares input data line 120.1 and input data line 120.2, giving output on output transmission line 130.2. The fourth differential amplifier 150.3 compares input data line 120.2 and input data line 120.3, giving output on output transmission line 130.3. And the fifth differential amplifier 150.4 compares reference voltage line 112 and input data line 120.3, giving output on output transmission line 130.4.

If the number of input data lines equals one, then this scheme becomes equivalent to a differential transmission line. Any number of data input lines greater than one increases the number of transmission lines by the same number. The number of required transmission lines can be determined by the simple formula n+1, where n is the number of input lines. As an example, four input data lines require five transmission lines, and eight input data lines require nine transmission lines. This provides significant savings in the number of transmission lines over conventional differential transmission, which requires two transmission lines for every one input data line (the conventional number of required transmission lines=n*2, where n is the number of input lines). The reduced number of transmission lines provides other benefits as well. Fewer lines means less power is consumed by the transmitter circuit. Also, since the transmitter is issuing fewer signals, the noise level at the transmitter is reduced.

Figure 4:
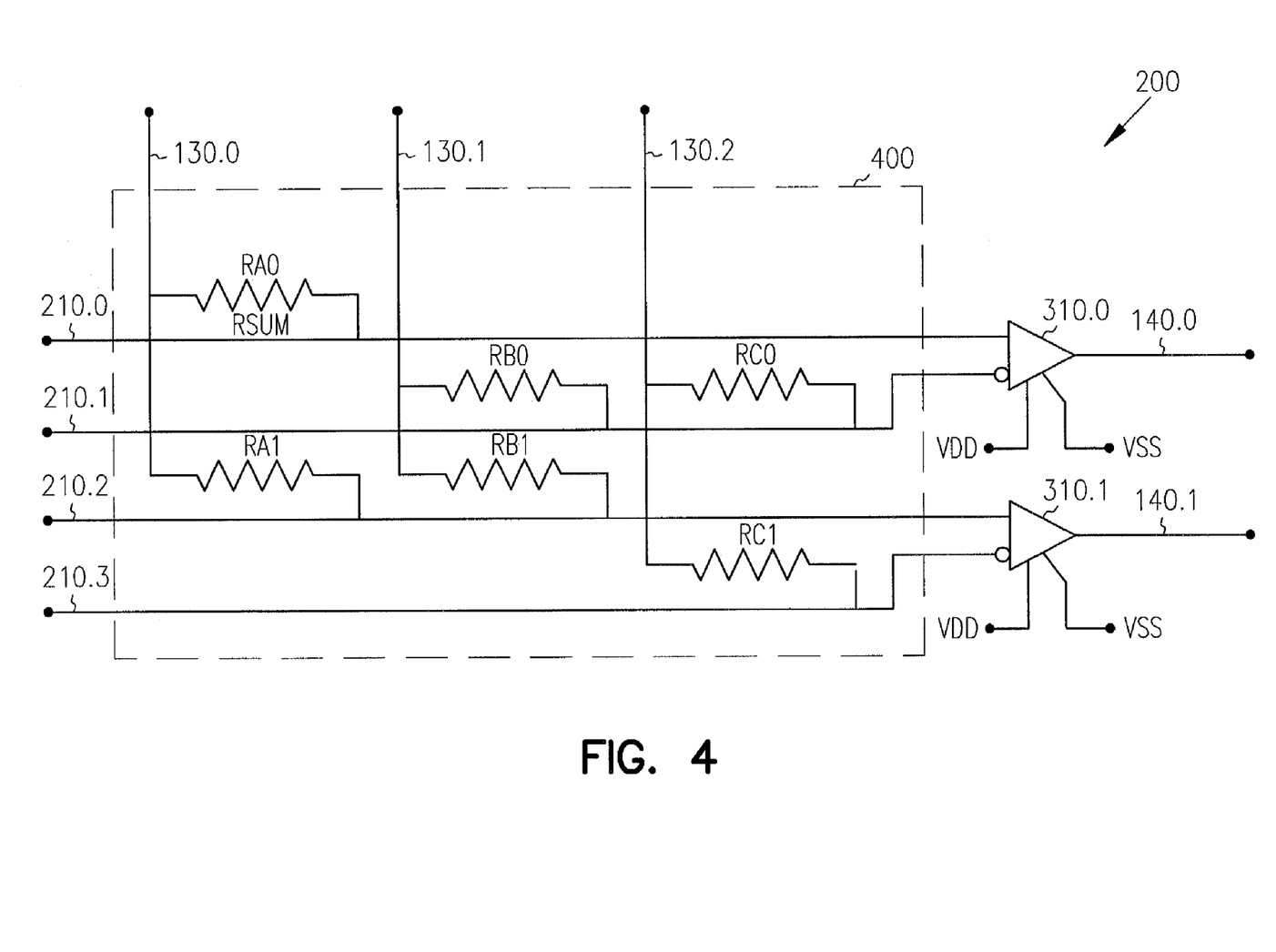
FIG. 4 is a schematic drawing of a spacial derivative decoder 200 comprising three input data lines according to one embodiment of the present invention.

FIG. 4 is a schematic drawing of a receiver comprising a spacial derivative decoder 200 according to one embodiment of the present invention. To decode the encoded signals received on data input lines 130.0–130.2 the following calculation is used for i=0 to (n−1), where n is the number of data input lines, Output(i) is the data output line reference, and IN(i) is the transmission line reference:

$$\text{Output}(i) = \text{average}(\text{IN}(0) \text{ through } \text{IN}(i)) - \text{average}(\text{IN}(i+1) \text{ through } \text{IN}(n))$$

One skilled in the art will recognize that any number of input lines greater than one can be used without exceeding the scope or spirit of the invention. Differential output transmitted by encoder 100 is received by decoder 200 on transmission lines 130.0–130.2. Resistor network 400 comprises a pattern of resistors RA0-RC1 and averages the signals received on transmission lines 130.0–130.2. In the embodiment shown resistor network 400 comprises two resistors for every input data line. It is to be recognized that FIGS. 4 and 5 are exemplary only and that resistor network 400 is flexible enough to accommodate any number of input data lines.

As an example of the operation of the spacial derivative decoder shown in FIG. 4, line 210.0 carries the voltage received from transmission line 130.0 to one input of differential amplifier 310.0. Line 210.1 carries the average voltage from the remaining transmission lines 130.1, 130.2 to a second input of the differential amplifier 310.0. Differential amplifier 310.0 performs the subtraction, transmitting the decoded signal on output data line 140.0. Differential amplifier 310.1 generates the signal for output data line 140.1 by determining the difference between the average voltage of lines 130.0, 130.1 (received by differential amplifier 310.1 on line 210.2) and the voltage received on input data line 130.2 (received by differential amplifier 310.1 on line 210.3).

Figure 5:
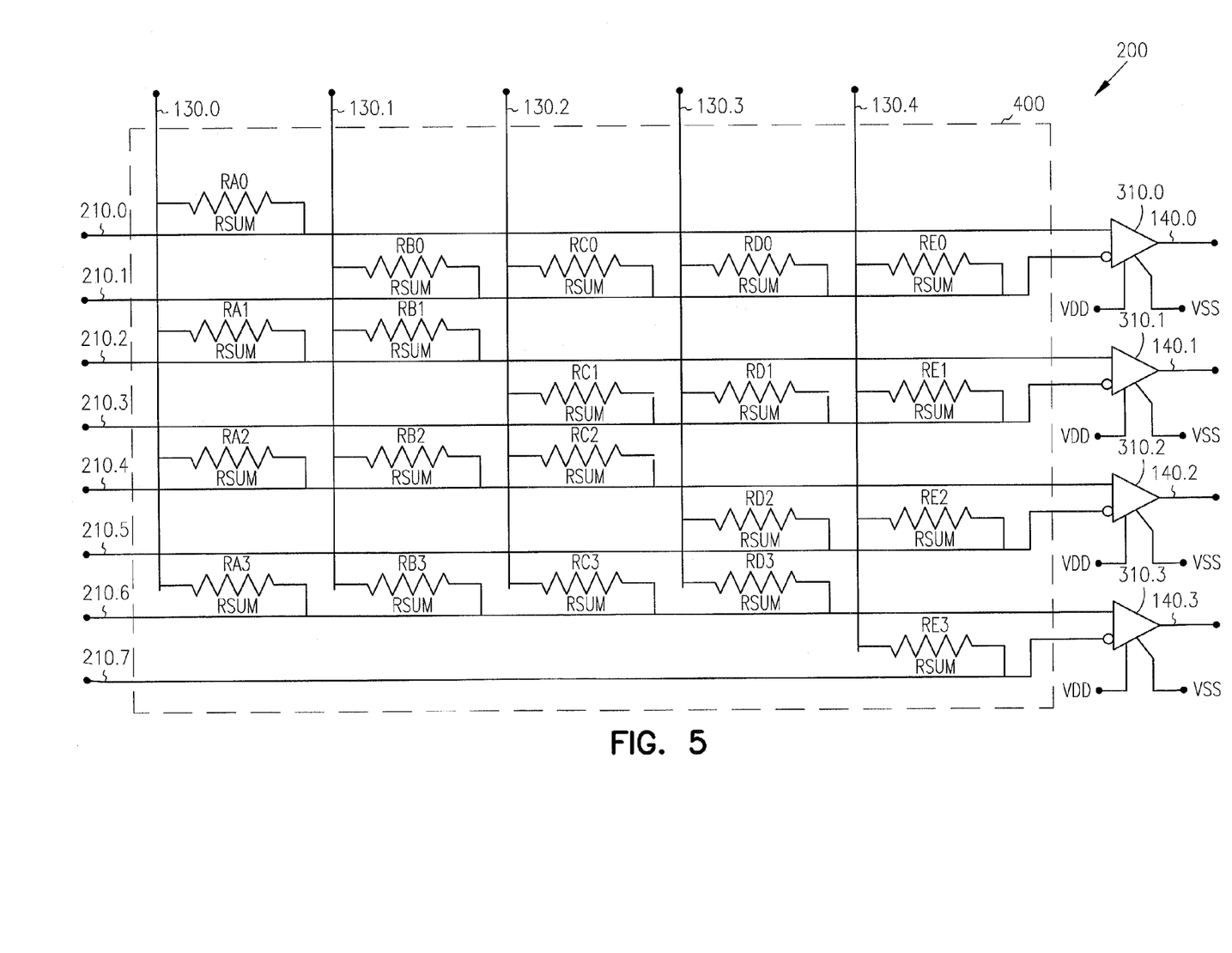
FIG. 5 is a schematic drawing of a spacial derivative decoder 200 comprising five input data lines according to another embodiment of the present invention.

FIG. 5 illustrates a spacial derivative decoder comprising five input data lines. Input data lines 130.0–130.4 and differential amplifiers 310.0–310.3 are connected to resistor network 400. Differential amplifier 310.0 determines the difference between the voltage on data input line 130.0 (via line 210.0) and the average voltage of the remaining input data lines 130.1–130.4 (via line 210.1). Differential amplifier 310.1 determines the difference between the average voltage of data input lines 130.0 and 130.1 (via line 210.2) and the average voltage of the remaining input data lines 130.2–130.4 (via line 210.3). Differential amplifier 310.2 determines the difference between the average voltage of data input lines 130.0–130.2 (via line 210.4) and the average voltage of the remaining input data lines 130.3–130.4 (via line 210.5). Differential amplifier 310.3 determines the difference between the voltage on data input line 130.4 (via line 210.7) and the average voltage of the remaining input data lines 130.0–130.3 (via line 210.6). The decoded signals are transmitted by differential amplifiers 310.0–310.3 on output transmission lines 140.0–140.3, respectively.

Figure 6:
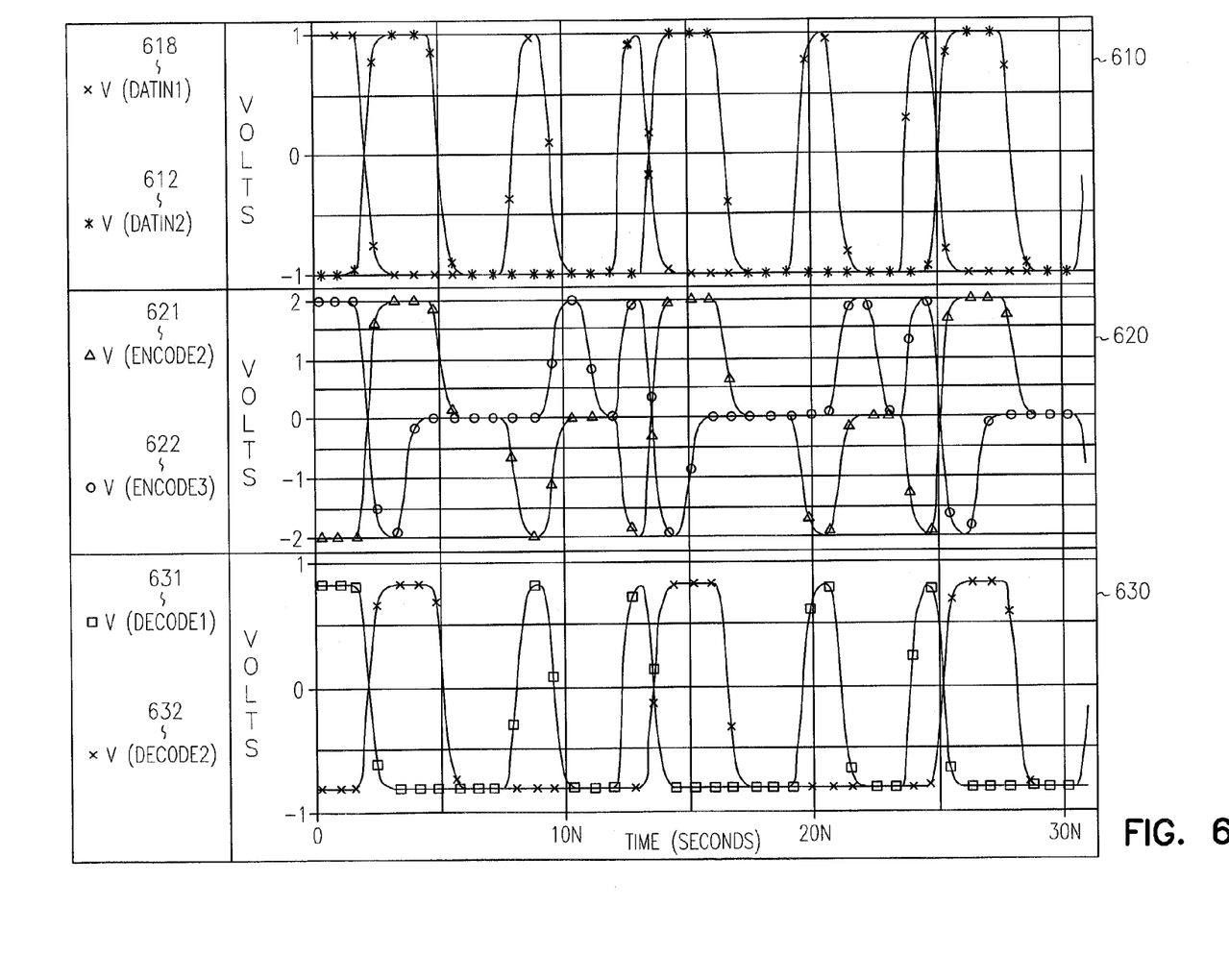
FIG. 6 is a representation of oscilloscope displays of an input data signal and a reference voltage signal in their original form, after they have been encoded, and after they have been decoded.

FIG. 6 is a representation of oscilloscope displays of the transitions of an input data signal and a reference voltage signal through the various stages according to one embodiment of the present invention. The first display 610 shows a representation of an input data signal 612 and a reference voltage signal 611, such as might be received by encoder 100 on lines 120.0, 110, respectively. The data being transmitted is represented by the difference between the two signals 612, 611. The second display 620 shows a representation of two encoded transmissions 621, 622 such as are transmitted by encoder 100 on transmission lines 130.0–130.4. Note that the differential amplifiers 150.0–150.3 introduce a gain of one to enable more accurate interpretation of the signals at the receiving end. As can be seen from the display, the reference voltage signal effectively complements the input data signal. The third display 630 shows the decoded signals 631, 632 after they have been received and decoded by decoder 200. The data message is reflected by the difference between the signals 631, 632.

In another embodiment, signals are processed through a time-domain encoding scheme prior to differential encoding. Time-domain encoding enables the system to account for the actual variation of a signal voltage over time. Thus the system is able to compensate for signal dispersion and reduce the effect of base line wander due to frequency-dependent attenuation on lines. Time-domain encoding also reduces inter-symbol interference caused by propagation delays between the first- and last-arriving significant signal components resulting from reflections or dispersion on the signal lines.

The system of the present invention increases the data bandwidth on data buses by reducing noise generation at the transmitter and rejecting common mode noise at the receiver. The affect of purely random noise must still be considered, but a properly configured digital system minimizes this type of noise.

Although the present invention has been described with reference to the preferred embodiments, those skilled in the art will recognize that changes may be made in form and detail without departing from the spirit and scope of the invention.

What is claimed is:

1. A method of transmitting n signals over transmission lines to a receiver, wherein n is an integer greater than one and wherein the n signals include signals IN(0) through IN(n−1), the method comprising:
    providing a first and a second reference voltage; and
    encoding the n signals into n+1 encoded signals comprising signals enc(0) through enc(n), wherein encoding comprises:
        determining the difference between the first reference voltage and signal IN(0) and generating a signal enc(0) as a function of the difference between the first reference voltage and signal IN(0);
        for I from 1 to (n−1) determining the difference between signal IN(I−1) and signal IN(I) and generating a signal enc(I) as a function of the difference between signal IN(I−1) and signal IN(I);
        determining the difference between the second reference voltage and signal IN(n−1) and generating a signal enc(n) as a function of the difference between the second reference voltage and signal IN(n−1); and
    concurrently driving n+1 encoded signals enc(0) through enc(n) on separate output transmission lines to the receiver; and
    decoding the n+1 encoded signals enc(0) through enc(n) received at the receiver into n output signals that correspond to signals IN(0) through IN(n−1).

2. The method of claim 1 wherein encoding further comprises encoding the n signals using time domain encoding.

3. A method of decoding encoded signals, wherein the encoded signals include signals enc(0) through enc(m−1), wherein m is an integer greater than two, the method of decoding comprising:
    receiving the encoded signals;
    decoding the encoded signals into (m−1) output signals, wherein the output signals include signals Output(0) through Output(m−2) and wherein decoding includes, for an integer I from 0 to m−2:
        providing a first voltage as a function of signals enc(0) through enc(I), wherein providing a first voltage includes summing signals enc(0) through enc(I);
        providing a second voltage as a function of signals enc(I+1) through enc(m−1), wherein providing a second voltage includes summing signals enc(I+1) through enc(m−1);
        determining a difference between the first voltage and the second voltage; and
        transmitting the difference as signal Output(I).

4. A system comprising:
    an encoder to receive n input signals and concurrently transmit n+1 encoded signals on n+1 transmission lines, and a receiver to receive the encoded signals from the transmission lines and decode the n+1 encoded signals into n output signals corresponding to the n input signals, the encoder including:
    a first reference signal;
    a plurality of input data signals, including a first, a second and a third input data signal; and
    a first, a second, a third and a fourth differential amplifier;
    wherein the first differential amplifier is connected to the first reference signal and the first input data signal and transmits a signal on a first transmission line to the receiver as a function of the difference between the reference signal and the first input data signal;
    wherein the second differential amplifier is connected to the first and second input data signals and transmits a signal on a second transmission line to the receiver as a function of the difference between the first and second input data signals; and wherein the third differential amplifier is connected to the second and third input data signals and transmits a signal on a third transmission line to the receiver as a function of the difference between the second and third input data signals; and wherein the fourth differential amplifier is connected to the third input data signal and a second reference signal and transmits a signal on a fourth transmission line to the receiver as a function of the difference between the third input data signal and the second reference signal.

5. A system comprising:

an encoder to receive n input signals and concurrently transmit n+1 encoded signals on n+1 transmission lines, and a receiver to receive the encoded signals from the transmission lines and decode the n+1 encoded signals into n output signals corresponding to the n input signals, the encoder including:

a first and a second reference signal;

a plurality of input data signals, including a first, a second, a third and a fourth input data signal; and a first, a second, a third, a fourth and a fifth differential amplifier;

wherein the first differential amplifier is connected to the first reference signal and the first input data signal and transmits a signal on a first transmission line to the receiver as a function of the difference between the first reference signal and the first input data signal;

wherein the second differential amplifier is connected to the first and second input data signal and transmits a signal on a second transmission line to the receiver as a function of the difference between the first and second input data signals;

wherein the third differential amplifier is connected to the second and third input data signal and transmits a signal on a third transmission line to the receiver as a function of the difference between the second and third input data signals;

wherein the fourth differential amplifier is connected to the third and fourth input data signal and transmits a signal on a fourth transmission line to the receiver as a function of the difference between the third and fourth input data signals; and wherein the fifth differential amplifier is connected to the fourth input data signal and the second reference signal and transmits a signal on a fifth transmission line to the receiver as function of the difference between the second reference signal and the fourth input data signal.

6. A system comprising:

an encoder to receive n input signals and concurrently transmit n+1 encoded signals on n+1 transmission lines, and a receiver to receive the encoded signals from the transmission lines and decode the n+1 encoded signals into n output signals corresponding to the n input signals, the encoder including:

a first reference signal;

a plurality of input data signals, including a first, a second and a third input data signal; and a plurality of differential amplifiers, including a first, a second, a third and a fourth differential amplifier;

wherein the first differential amplifier is connected to the first reference signal and the first input data signal and transmits a signal on a first transmission line to the receiver as a function of the difference between the reference signal and the first input data signal;

wherein the second differential amplifier is connected to the first and second input data signal and transmits a signal on a second transmission line to the receiver as a function of the difference between the first and second input data signals;

wherein the third differential amplifier is connected to the second and third input data signal and transmits a signal on a third transmission line to the receiver as a function of the difference between the second and third input data signals; and wherein the fourth differential amplifier is connected to the third input data signal.

7. The spacial derivative encoder of claim 6, wherein the fourth differential amplifier is further connected to a second reference signal and wherein the fourth differential amplifier transmits a signal on a fourth transmission line as a function of the difference between the third input data signal and the second reference signal.

8. The spacial derivative encoder of claim 6, wherein the spacial derivative encoder further comprises a fourth and a fifth input data signal and a fifth and sixth differential amplifier;

wherein the fourth differential amplifier is further connected to the fourth input data signal and transmits a signal on a fourth transmission line as a function of the difference between the third and fourth input data signals;

wherein the fifth differential amplifier is connected to the fourth and fifth input data signals and transmits a signal on a fifth transmission line as function of the difference between the fourth and fifth input data signals; and wherein the sixth differential amplifier is connected to a second reference signal and the fifth input signal and transmits a signal on a sixth transmission line as a function of the difference between the second reference signal and the fifth input data signal.

9. A method to transmit n input signals over a set of n+1 transmission lines, wherein n is an integer greater than one, the method comprising:

encoding the n input signals using a first reference voltage and a second reference voltage into n+1 encoded signals, including comparing the first reference voltage and one of the input signals and comparing the second reference voltage and one of the input signals;

concurrently transmitting the n+1 encoded signals over the set of n+1 transmission lines, each of the encoded signals being transmitted over a separate one of the n+1 transmission lines; and receiving the n+1 encoded signals; and decoding the n+1 encoded signals into n decoded signals corresponding to the n input signals.

10. A method to transmit n input signals over a set of n+1 transmission lines, wherein n is an integer greater than one, the method comprising:

encoding the n input signals using a first reference voltage and a second reference voltage into n+1 encoded signals;

concurrently transmitting the n+1 encoded signals over the set of n+1 transmission lines, each of the encoded signals being transmitted over a separate one of the n+1 transmission lines; and receiving the n+1 encoded signals; and decoding the n+1 encoded signals into n decoded signals corresponding to the n input signals, wherein:

the n input signals include a first input signal, and an $n_{th}$ input signal; and encoding the n input signals includes:
- comparing a difference between the first reference voltage and the first input signal to generate one of the n+1 output signals;
- comparing a difference between two of the n input signals to generate one of the n+1 output signals; and
- comparing a difference between the $n_{th}$ input signal and the second reference voltage to generate one of the n+1 output signals.

11. A data transmission system, comprising:
an encoder, including:
- a set of data encoder inputs to couple to n data signals, to couple to a first reference signal to compare to a first one of the n data signals, and to couple to a second reference signal to compare to an nth one of the n data signals, wherein n is an integer greater than one; and
- a set of n+1 encoder outputs to couple to a set of n+1 transmission lines; and a decoder including:
- a set of n+1 decoder inputs to couple to the set of n+1 transmission lines; and
- a set of n decoder outputs corresponding to the set of n encoder inputs.

12. A data transmission system, comprising:
an encoder, including:
- a set of n encoder inputs to couple to n data signals, wherein n is an integer greater than one;
- a first reference input to couple to a first reference signal;
- a second reference input to couple to a second reference signal; and
- a set of n+1 encoder outputs to couple to a set of n+1 transmission lines; and a decoder including:
- a set of n+1 decoder inputs to couple to the set of n+1 transmission lines; and a set of n decoder outputs corresponding to the set of n encoder inputs, wherein the encoder includes n+1 comparators, including:
- a first comparator to compare a difference between the first reference signal and a first data signal; and
- a second comparator to compare a difference between the nth data signal and the second reference signal,
- each of the remaining n−1 encoders to compare a difference between two data signals on two of the n encoder inputs, each of the n encoder inputs being coupled to two comparators.

13. A data transmission system, comprising:
an encoder, including:
- a set of n encoder inputs to couple to n data signals, wherein n is an integer greater than one;
- a first reference input to couple to a first reference signal;
- a second reference input to couple to a second reference signal; and
- a set of n+1 encoder outputs to couple to a set of n+1 transmission lines; and a decoder including:
- a set of n+1 decoder inputs to couple to the set of n+1 transmission lines; and
- a set of n decoder outputs corresponding to the set of n encoder inputs,
wherein the decoder includes:
a resistive network including:
- a set of n+1 network inputs corresponding to and to couple with the set of n+1 transmission lines;
- a set of 2n network outputs; and
- a set of n comparators, each comparator having a first and a second input, each input being coupled to a corresponding one of the 2n network outputs, each comparator having an output to function as one of the set of n decoder outputs.

* * * * *

UNITED STATES PATENT AND TRADEMARK OFFICE
CERTIFICATE OF CORRECTION

| | |
|---|---|
| PATENT NO. | : 7,167,523 B2 |
| APPLICATION NO. | : 10/171095 |
| DATED | : January 23, 2007 |
| INVENTOR(S) | : Mansur |

It is certified that error appears in the above-identified patent and that said Letters Patent is hereby corrected as shown below:

In column 6, line 5, in Claim 1, delete "TN(0)" and insert -- IN(0) --, therefor.

In column 6, line 13, in Claim 1, delete "1N(n-1)" and insert -- IN(n-1) --, therefor.

In column 9, line 1, in Claim 10, delete "$n_{th}$" and insert -- nth --, therefor.

In column 9, line 10, in Claim 10, delete "$n_{th}$" and insert -- nth --, therefor.

Signed and Sealed this

Fourth Day of September, 2007

JON W. DUDAS
*Director of the United States Patent and Trademark Office*